(12) United States Patent
Mingerink et al.

(10) Patent No.: US 9,981,614 B2
(45) Date of Patent: May 29, 2018

(54) FASTENER CLIP

(71) Applicant: Summit Polymers, Inc., Portage, MI (US)

(72) Inventors: Ernest James Mingerink, Wyoming, MI (US); Craig Steven Boris, Mattawan, MI (US); Brian Michael Boyer, Marcellus, MI (US)

(73) Assignee: Summit Polymers, Inc., Portage, MI (US)

( * ) Notice: Subject to any disclaimer, the term of this patent is extended or adjusted under 35 U.S.C. 154(b) by 61 days.

(21) Appl. No.: 15/174,984

(22) Filed: Jun. 6, 2016

(65) Prior Publication Data

US 2017/0349117 A1 Dec. 7, 2017

(51) Int. Cl.
*B60R 13/00* (2006.01)
*F16B 2/22* (2006.01)

(52) U.S. Cl.
CPC ............. *B60R 13/00* (2013.01); *F16B 2/22* (2013.01)

(58) Field of Classification Search
CPC .................................. B60R 13/00; F16B 2/22
See application file for complete search history.

(56) References Cited

U.S. PATENT DOCUMENTS

| | | | | |
|---|---|---|---|---|
| 4,402,118 A * | 9/1983 | Benedetti | ............... | F16B 5/065 24/289 |
| 6,449,814 B1 * | 9/2002 | Dinsmore | ............... | F16B 5/065 24/289 |
| 7,231,696 B2 * | 6/2007 | Asano | ................ | B60R 13/0206 24/297 |
| 7,536,755 B2 * | 5/2009 | Nakajima | ............... | F16B 5/065 24/297 |
| 8,567,017 B2 * | 10/2013 | Iwahara | .................. | F16B 5/065 24/297 |
| 9,488,202 B2 * | 11/2016 | Komeno | ............ | B60R 13/0206 |
| 2009/0236486 A1 * | 9/2009 | Matsuno | ............ | B60R 16/0215 248/316.7 |
| 2013/0199003 A1 * | 8/2013 | Iwahara | .................... | F16B 2/22 24/530 |
| 2013/0255119 A1 * | 10/2013 | Boyer | ....................... | G09F 7/16 40/596 |
| 2013/0340216 A1 * | 12/2013 | Smith | ...................... | F16B 2/22 24/564 |
| 2014/0109357 A1 * | 4/2014 | Fischer | .................. | F16B 2/243 24/455 |
| 2015/0076304 A1 * | 3/2015 | Hattori | .................. | F16B 21/075 248/231.81 |

(Continued)

*Primary Examiner* — Robert Sandy
*Assistant Examiner* — Louis A Mercado
(74) *Attorney, Agent, or Firm* — McGarry Bair PC

(57) ABSTRACT

A fastener is provided for mounting a first structure having an insertion rib with a retention slot to a second structure having a mounting opening. The fastener includes a U-shaped body having a bight portion at an upper portion thereof with a pair of outer legs depending therefrom. Each of the pair of outer legs terminates at a distal free end to engage an edge of the mounting opening when the U-shaped body penetrates the mounting opening. A pair of inner legs extends from the distal free ends of the outer legs toward the bight portion. The pair of inner legs has an intermediate protrusion configured to engage the insertion rib and bear against a stop in the retention slot to retain the U-shaped body on the first structure.

19 Claims, 5 Drawing Sheets

(56) References Cited

U.S. PATENT DOCUMENTS

| | | | |
|---|---|---|---|
| 2015/0211565 A1* | 7/2015 | Benedetti | B60R 13/0206 |
| | | | 24/292 |
| 2016/0016522 A1* | 1/2016 | Smith | F16B 37/043 |
| | | | 296/35.1 |
| 2016/0280107 A1* | 9/2016 | Sato | B29C 45/0025 |
| 2016/0280172 A1* | 9/2016 | Yamamoto | B60R 21/20 |
| 2016/0375840 A1* | 12/2016 | Dickinson | F16B 5/065 |
| | | | 24/295 |
| 2017/0198733 A1* | 7/2017 | Fay | F16B 2/22 |

\* cited by examiner

FASTENER CLIP

BACKGROUND

Clips or fasteners are known for removably mounting a first structure to a second structure provided with a mounting opening. The first structure can have an insertion rib with an insertion slot, and the clip or fastener is configured to be attached to the insertion rib by way of the insertion. The clip or fastener is also configured to be received in the mounting opening. Typically, the first structure might be a trim piece and the second structure might be an instrument panel or other vehicular sub-structure. Several clips can be used to mount the first structure to the second structure.

BRIEF SUMMARY

An aspect of the invention is directed to a fastener for mounting a first structure having an insertion rib with a retention slot to a second structure having a mounting opening. The fastener comprises a resilient U-shaped body having a bight portion at an upper portion thereof with a pair of outer legs depending therefrom, each of the pair of outer legs terminating at an outer distal free end. The outer distal free end of the outer legs has an outer surface adapted to engage an edge of the mounting opening when the U-shaped body penetrates the mounting opening. An inner leg extends from the distal free end of each of the outer legs between the pair of outer legs toward the bight portion and terminating at an inner distal free end adjacent to the outer leg. Each of the pair of inner legs has an intermediate protrusion between the outer distal free end and the inner distal free end configured to engage the insertion rib and bear against a stop in the retention slot and the inner distal free end is configured to bear against the insertion rib spaced from the retention slot to retain the U-shaped body on the first structure, with only the intermediate protrusions and the inner distal free ends in contact with the insertion rib.

DETAILED DESCRIPTION

Figure 1:
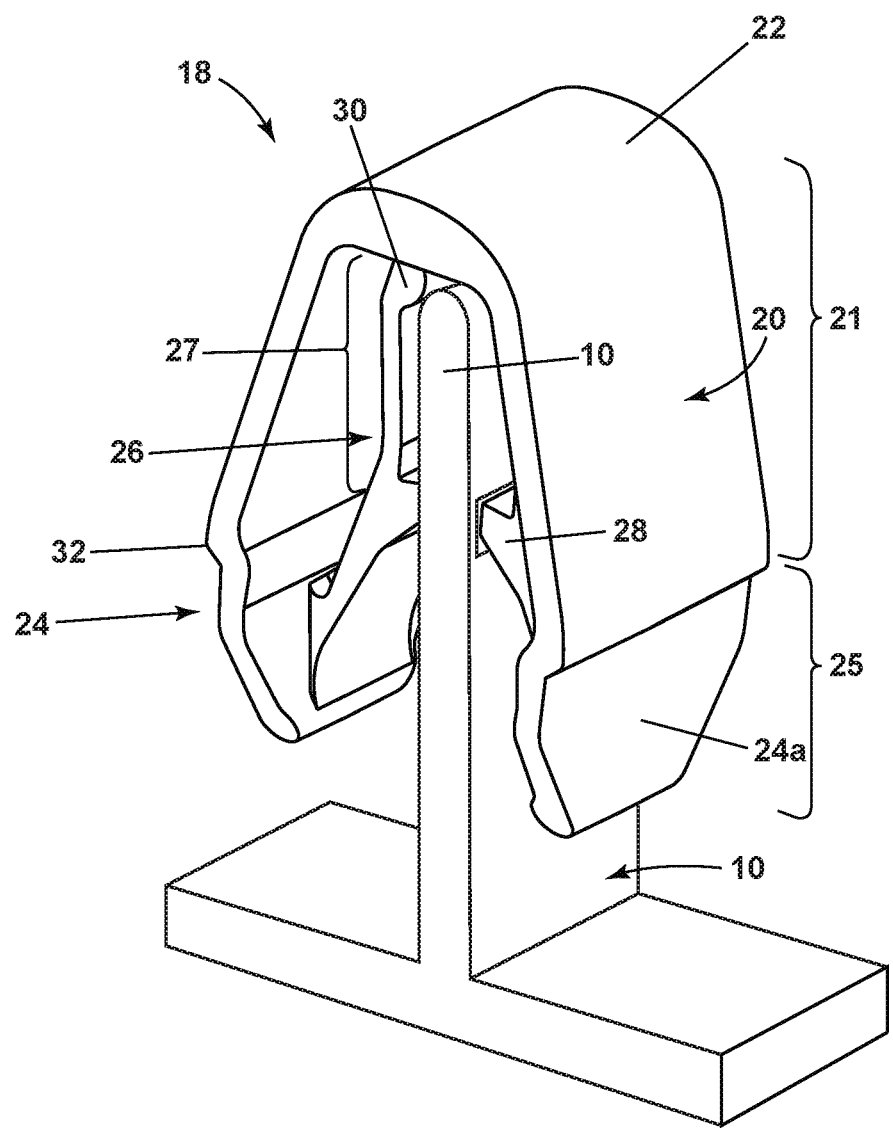
FIG. 1 is an isometric view of a fastener clip according to an embodiment of the invention showing the fastener clip mounted on an insertion rib having a retention slot.

FIG. 1 illustrates an isometric view of a fastener clip 18 mounted on first structure 10. The fastener clip 18 comprises a U-shaped body 20, a pair of outer legs 24, and a pair of inner legs 26.

The U-shaped body includes a curved, or bight portion 22 at an upper portion 21 thereof, with the pair of outer legs 24 depending therefrom. Each of the pair of outer legs terminates at an outer distal free end 25 having an outer surface 24a. The outer surface 24a of the outer distal free end 25 may comprise a shoulder 32, and the shoulder 32 may be disposed closer to the outer distal free end 25 of each of the pair of outer legs 24. It is not contemplated that the shoulder 32 is an outwardly extending flange, but rather an outwardly extending sharp curvature.

Each of the pair of inner legs 26 extends from the outer distal free end 25, between the pair of outer legs 24 toward the bight portion 22, and terminates at an inner distal free end 27 adjacent to the outer leg 24. Each of the pair of inner legs 26 comprises an intermediate protrusion 28 between the outer distal free end 25 and the inner distal free end 27. The intermediate protrusions 28 on the inner legs 26 face each other in a facing relationship. A nub 30 may be located at the inner distal free end on each of the inner legs 26, and the nub 30 may extend inwardly of each of the pair of inner legs 26.

Figure 2:
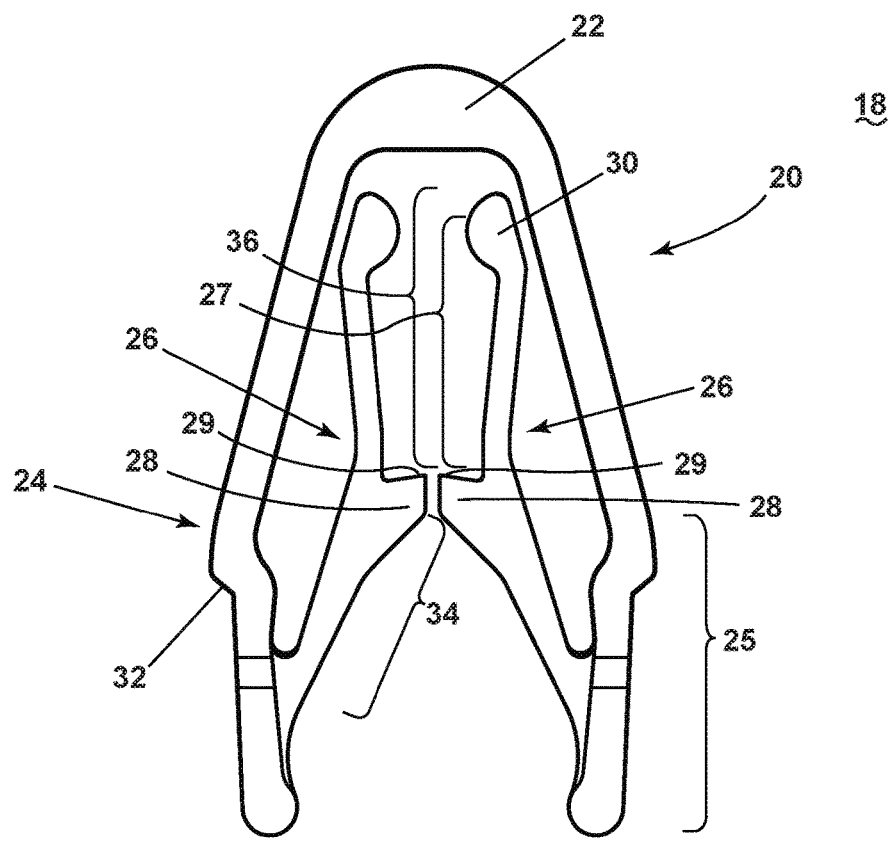
FIG. 2 is a front view of the fastener clip of FIG. 1.

Turning to FIG. 2, a first portion 34 of each of the pair of inner legs 26 extends between the outer distal free end 25 and the intermediate protrusion 28, while a second portion 36 of each of the pair of inner legs 26 extends from the intermediate protrusion 28 to the inner distal free end 27. The first and second portions 34, 36 are not collinear. It is contemplated that the width of each of the pair of outer legs 24 is greater than the width of each of the pair of inner legs 26 as seen in FIG. 1.

Figures 3A, 3B:
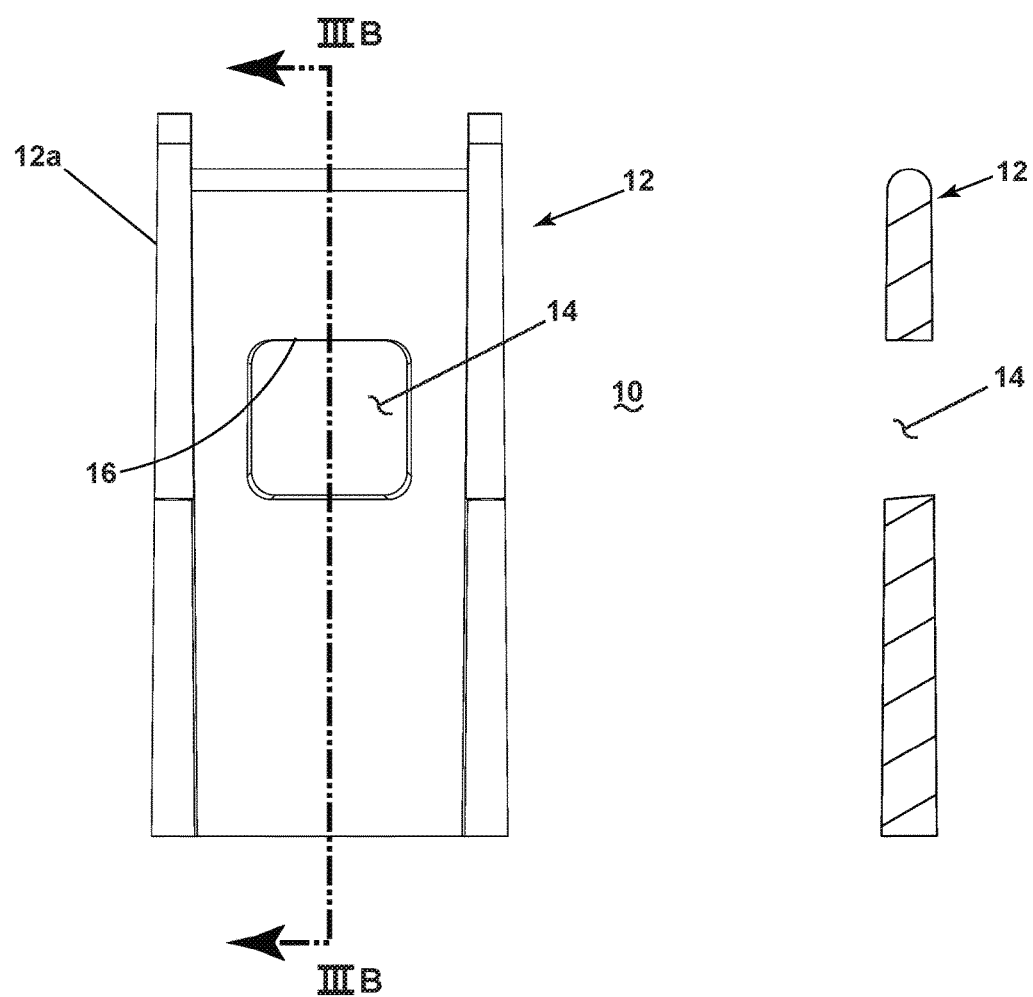
FIG. 3A is a side view portion of the insertion rib along line BB.
FIG. 3B is a cross-sectional side view of the insertion rib of FIG. 3A along line BB.

FIG. 3A illustrates a side view portion of the insertion rib 12 along line BB for a first structure 10 having a retention slot 14. The insertion rib 12 comprises a surface 12a. The retention slot 14 comprises a stop 16. FIG. 3B illustrates a cross-sectional side view of the insertion rib 12 along line BB, having a retention slot 14.

Figure 4:
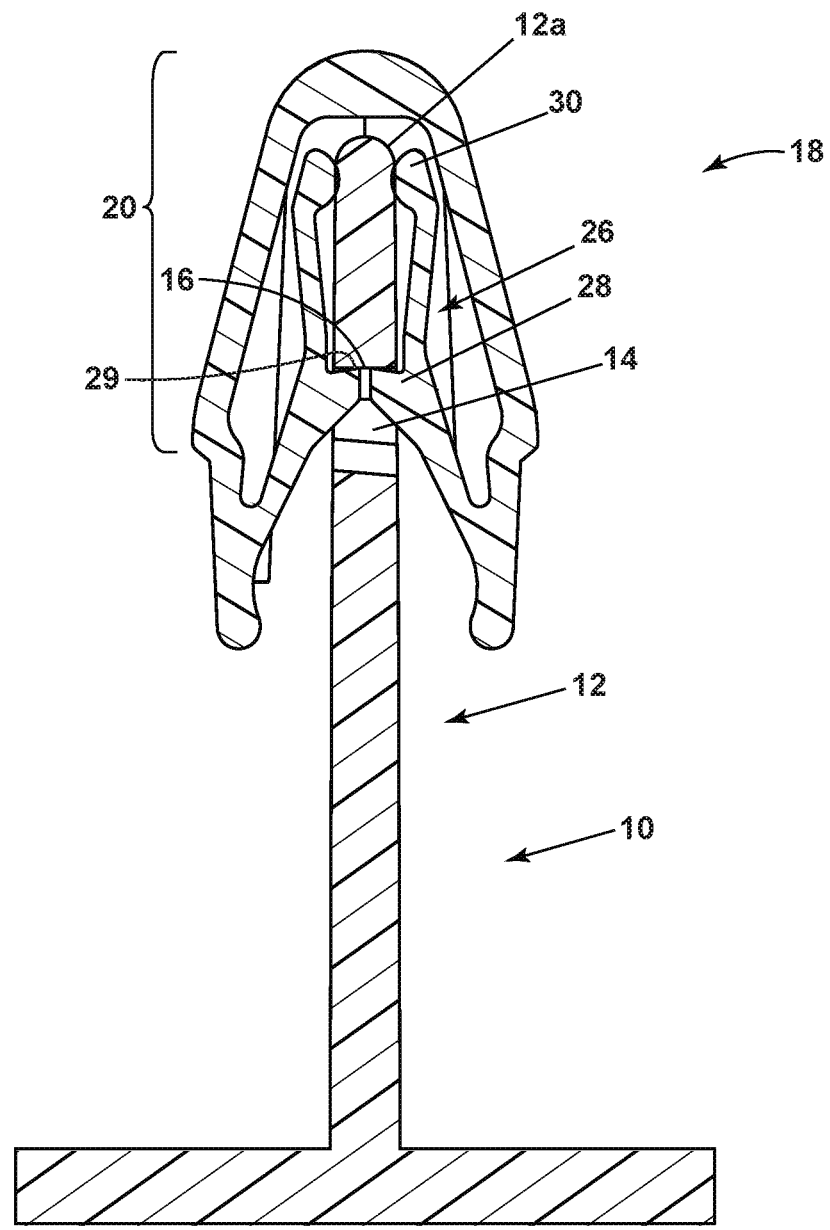
FIG. 4 is a cross-sectional view of fastener clip of FIG. 1 mounted on the insertion rib having a retention slot of FIG. 1.

FIG. 4 illustrates a cross-sectional view of the fastener clip 18 mounted on the first structure 10. The intermediate protrusions 28 of each of the pair of inner legs 26 are configured to engage the insertion rib 12 and bear against a stop 16 in the retention slot 14 to retain the U-shaped body 20 on the first structure 10. The intermediate protrusions 28 define a gripper surface 29 adapted to engage the insertion rib 12. Similarly, the nubs 30 on the inner distal free end on each of the inner legs 26 are adapted to engage a surface 12a of the insertion rib 12.

Figure 5:
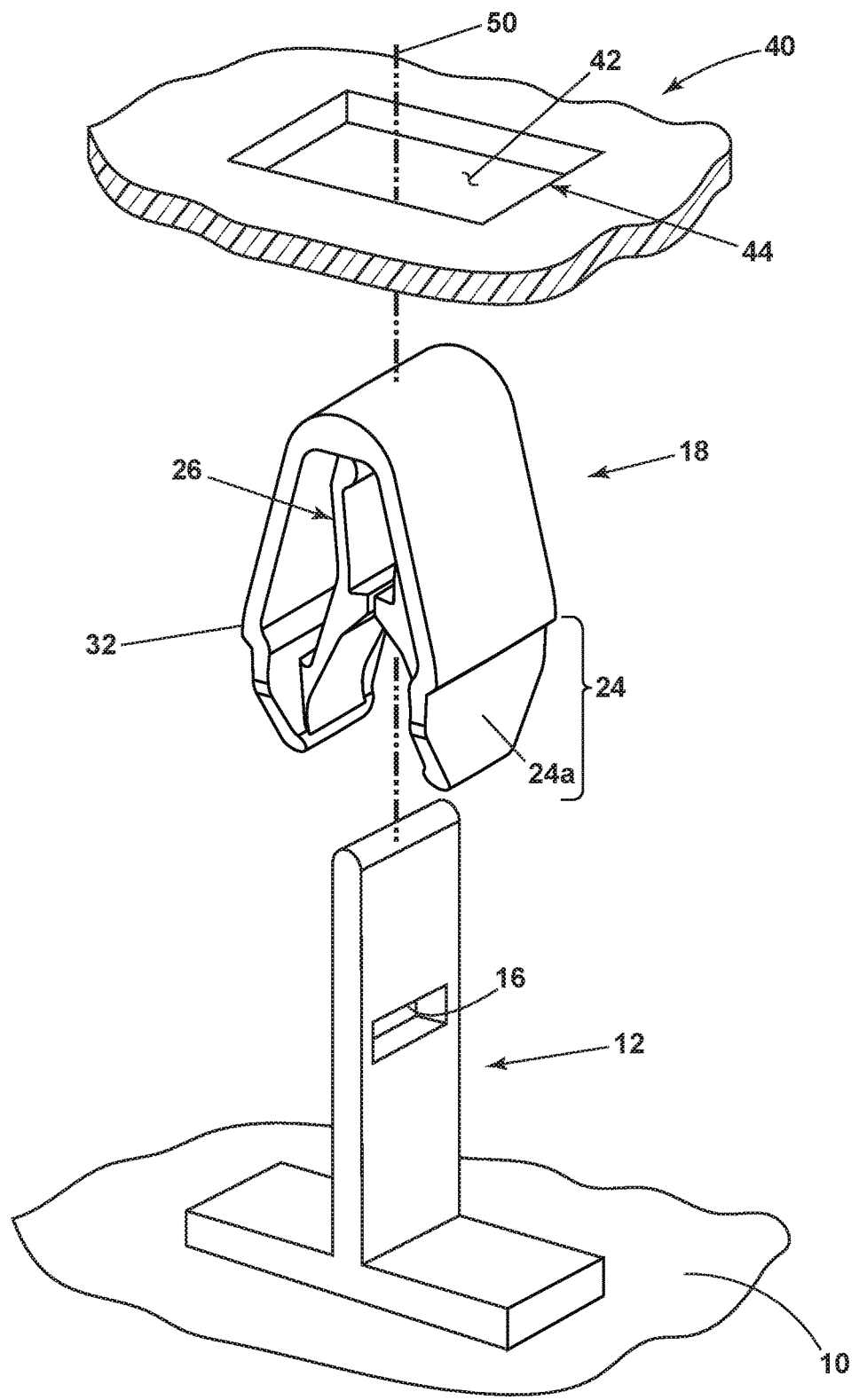
FIG. 5 is an isometric, exploded view of the of the fastener clip of in FIG. 1 showing inner legs of the fastener clip aligned with the insertion rib having the retention slot of FIG. 1 and outer legs of the fastener clip aligned with a mounting opening.

Turning to FIG. 5, the inner legs 26 of the fastener clip 18 are aligned with the insertion rib 12, and the outer legs 24 of the fastener clip 18 are aligned with a mounting opening 42 of the second structure 40 along a medial axis 50. The outer surface 24a of the outer legs 24 is adapted to engage an edge of the mounting opening 42 when the U-shaped body 20 penetrates the mounting opening 42. The shoulder 32 of the outer legs 24 is adapted to receive an upper edge 44 of the mounting opening 42.

For purposes of this description, it will be understood that the terms "inner" and "outer" are used with reference to the medial axis 50 whereby "inner" refers to a point closer in proximity to the medial axis 50 than an element referred to as "outer."

It will be understood that the configuration of the bight portion 22, the outer surface of the outer legs 24, the shoulder 32, the nub 30, and the intermediate protrusion 28 can be selected to provide desirable loading, insertion, retention and removal forces as needed for a particular application. Wide variation in these configurations can be had without departing from the scope of the invention described herein. For example, the outer surfaces of the outer legs 24, while shown as planar, can be provided with various curvatures or other continuous or discontinuous surface features to provide variable insertion forces into a mounting opening 42 in a second structure 40. The shoulder 32 or nub 30 can be made angular or rounded as need be. The shape of the inner protrusion 28 can be selected to provide a desired retention and removal force.

While the features of the outer legs 24, and shoulder 32, of the fastener clip 18 function to retain the clip 18 within a mounting opening 42 in a second structure 40, the interior of the clip 18 functions to retain the clip on an insertion rib 12 in a first structure 10.

To assemble the fastener clip 18 onto the insertion rib 12, the fastener clip 18 and the insertion rib 12 are preferably aligned along the medial axis 50 and the fastener clip 18 is thereafter directed toward the upper end of the insertion rib 12. As the upper end of the insertion rib 12 reaches the inner distal free end 27 of the inner legs 26, the upper end of the insertion rib 12 abuts the intermediate protrusions 28 and urges them apart so that the insertion rib 12 is passed between the opposed inner legs 26. Once the insertion rib 12 is urged between the inner legs 26 to a sufficient extent, the intermediate protrusions 28 encounter the retention slot 14 and, through the resiliency of the clip 18, are urged into the retention slot 14 back to the rest position of the inner legs 26. Thus, the fastener clip 18 is retained on the insertion rib 12 by the engagement of the intermediate protrusions 28 within the retention slot stop 16.

To assemble the subassembly of the fastener clip 18 and the insertion rib 12 onto the second structure 40, the subassembly of the fastener clip 18 and the insertion rib 12 is aligned along the medial axis 50 with the mounting opening 42 of the second structure 40. The subassembly is thereafter urged toward the mounting opening 42 until the bight portion 22 of the clip 18 passes into the mounting opening 42. Further passage of the clip 18 into the mounting opening 42 causes the outer surfaces 24a of the outer legs 24 to engage the upper edges of the mounting opening 44 of that the upper edges 44 cam along the outer surfaces 24a of the outer legs 24 until they reach the shoulders 32 thereof. At this point, the outer legs 26 preferably flex inwardly through the resiliency of the material making up the clip 18 about the bight portion 22 thereof so that the shoulders 32 of the clip 18 pass through the mounting opening 42. Once the U-shaped body 20 clears the mounting opening 42, the outer legs 24 spring back about the bight portion 22 to their rest position so that the shoulders 32 abut the mounting opening upper edge 44. At this point, the subassembly of the fastener clip 18 and the insertion rib 12 are mounted to the second structure 40. The insertion force required for assembly is less than the force required to remove, or disassemble the first structure 10, the fastener clip 18, and the second structure 40.

While the invention has been specifically described in connection with certain specific embodiments thereof, it is to be understood that this is by way of illustration and not of limitation, and the scope of the appended claims should be construed as broadly as the prior art will permit.

What is claimed is:

1. A fastener for mounting a first structure having an insertion rib with a retention slot to a second structure having a mounting opening comprising:
    a resilient U-shaped body having a bight portion at an upper portion thereof with a pair of outer legs depending therefrom, each of the pair of outer legs terminating at an outer distal free end and having an outer surface adapted to engage an edge of the mounting opening when the U-shaped body penetrates the mounting opening; and
    a pair of inner legs, each of the pair of inner legs extending from the distal free end of the outer leg between the pair of outer legs toward the bight portion and terminating at an inner distal free end adjacent to the outer leg;
    wherein each of the pair of inner legs has an intermediate protrusion between the outer distal free end and the inner distal free end configured to engage the insertion rib and bear against a stop in the retention slot and the inner distal free end is configured to bear against the insertion rib spaced from the retention slot to retain the U-shaped body on the first structure, with only the intermediate protrusions and the inner distal free ends in contact with the insertion rib.

2. The fastener of claim 1 wherein the intermediate protrusions on the pair of inner legs face each other in facing relationship.

3. The fastener of claim 1 wherein each of the pair of inner legs has a first portion extending between the outer distal free end and the intermediate protrusion, and a second portion extending from the intermediate protrusion to the inner distal free end, wherein the first and second portions are not collinear.

4. The fastener of claim 1 wherein the outer surface of the pair of outer legs has a shoulder adapted to receive an upper edge of the mounting opening.

5. The fastener of claim 1 wherein the intermediates protrusions define a gripper surface adapted to engage the insertion rib.

6. The fastener of claim 1 wherein a width of each of the pair of outer legs is greater than a width of each of the pair of inner legs.

7. The fastener of claim 1 wherein the outer distal free end is free of an outwardly extending flange.

8. A fastener for mounting a first structure having an insertion rib with a retention slot to a second structure having a mounting opening, comprising:
    a resilient U-shaped body having a bight portion at an upper portion thereof with a pair of outer legs depending therefrom, each of the pair of outer legs terminating at an outer distal free end and having an outer surface adapted to engage an edge of the mounting opening when the U-shaped body penetrates the mounting opening;
    a pair of inner legs, each of the pair of inner legs extending from the distal free end of the outer leg between the pair of outer legs toward the bight portion and terminating at an inner distal free end adjacent to the outer leg; and
    a nub at the inner distal free end of each of the pair of inner legs;
    wherein each of the pair of inner legs has an intermediate protrusion between the outer distal free end and the inner distal free end configured to engage the insertion rib and bear against a stop in the retention slot to retain the U-shaped body on the first structure.

9. The fastener of claim 8 further comprising a shoulder on an outer surface of each of the pair of outer legs.

10. The fastener of claim 9 wherein the shoulder is disposed closer to the outer distal free end that the intermediate protrusion.

11. The fastener of claim 8 further comprising a shoulder on an outer surface of each of the pair of outer legs.

12. The fastener of claim 11 wherein the nubs extend inwardly of each of the pair of inner legs.

13. The fastener of claim 11 wherein the nubs are adapted to engage a surface of the insertion rib.

14. The fastener of claim 11 wherein the shoulder is disposed closer to the outer distal free end that the intermediate protrusion.

15. The fastener of claim 8 wherein each of the pair of inner legs has a first portion extending between the outer distal free end and the intermediate protrusion, and a second portion extending from the intermediate protrusion to the inner distal free end, wherein the first and second portions are not collinear.

16. The fastener of claim 8 wherein the outer surface of the pair of outer legs has a shoulder adapted to receive an upper edge of the mounting opening.

17. The fastener of claim 8 wherein the intermediates protrusions define a gripper surface adapted to engage the insertion rib.

18. The fastener of claim 8 wherein a width of each of the pair of outer legs is greater than width of each of the pair of inner legs.

19. The fastener of claim 8 wherein the outer distal free end is free of an outwardly extending flange.

* * * * *